US012580992B2

(12) United States Patent
Lo et al.

(10) Patent No.: US 12,580,992 B2
(45) Date of Patent: Mar. 17, 2026

(54) DYNAMIC PER-LINK PROXYING OF TRAFFIC BETWEEN INTERCONNECTS OF DEVICES IN A FABRIC

(71) Applicant: Cisco Technology, Inc., San Jose, CA (US)

(72) Inventors: Jeffrey Yi Dar Lo, Cupertino, CA (US); Daniel Eric Talayco, Mountain View, CA (US); Robert Stephen Rodgers, Mountain View, CA (US); Kyle Andrew Donald Mestery, Woodbury, MN (US); Thomas John Giuli, Mountain View, CA (US)

(73) Assignee: Cisco Technology, Inc., San Jose, CA (US)

(*) Notice: Subject to any disclaimer, the term of this patent is extended or adjusted under 35 U.S.C. 154(b) by 84 days.

(21) Appl. No.: 18/507,944

(22) Filed: Nov. 13, 2023

(65) Prior Publication Data

US 2025/0159055 A1       May 15, 2025

(51) Int. Cl.
H04L 67/146          (2022.01)

(52) U.S. Cl.
CPC .................................. H04L 67/146 (2013.01)

(58) Field of Classification Search
CPC ..................................................... H04L 67/146
USPC ........................................................... 709/228
See application file for complete search history.

(56) References Cited

U.S. PATENT DOCUMENTS

| | | | |
|---|---|---|---|
| 7,082,460 B2 * | 7/2006 | Hansen | ............... H04L 41/0806 709/220 |
| 10,069,928 B1 | 9/2018 | Hardy et al. | |

| | | | |
|---|---|---|---|
| 11,197,224 B1 * | 12/2021 | Baker | ................. H04W 28/021 |
| 11,601,518 B1 | 3/2023 | Pilkauskas et al. | |
| 2005/0198022 A1 * | 9/2005 | Chang | ................ H04Q 3/54566 |
| 2011/0004674 A1 | 1/2011 | Zheng | |

(Continued)

FOREIGN PATENT DOCUMENTS

| | | | | |
|---|---|---|---|---|
| EP | 1719325 A1 * | 11/2006 | ......... | H04L 41/0816 |
| EP | 1719325 B1 | 3/2017 | | |
| WO | 2021205212 A1 | 10/2021 | | |

OTHER PUBLICATIONS

International Search Report and Written Opinion for International Application No. PCT/US2024/054530, mailed Feb. 18, 2025, 16 Pages.

*Primary Examiner* — Wing F Chan
*Assistant Examiner* — John Fan
(74) *Attorney, Agent, or Firm* — Rutan & Tucker, LLP; Ravi Mohan; Marc A. McClain

(57) ABSTRACT

Devices, networks, systems, methods, and processes for dynamically proxying traffic between interconnects of devices in a fabric are described herein. A communication network may include multiple switches, including gateway switches and non-gateway switches. Each switch can run a proxy agent for each port of the switch and for each link on each port. The switch may proxy data traffic within the communication network by utilizing the proxy agent. A non-gateway switch can send a connection request to a gateway switch to connect to an external cloud controller. The gateway switch may proxy the connection request to the external cloud controller and receive a session cookie. The non-gateway switch can establish a logical connection with the external cloud controller based on the session cookie.

20 Claims, 10 Drawing Sheets

(56) References Cited

U.S. PATENT DOCUMENTS

| | | | |
|---|---|---|---|
| 2019/0173850 A1* | 6/2019 | Jain | H04L 63/0428 |
| 2021/0044625 A1 | 2/2021 | Panchalingam et al. | |
| 2021/0218588 A1* | 7/2021 | Skillermark | H04W 40/32 |
| 2022/0109663 A1* | 4/2022 | Swain | H04L 69/24 |
| 2023/0188382 A1 | 6/2023 | Nath et al. | |

* cited by examiner

*300*

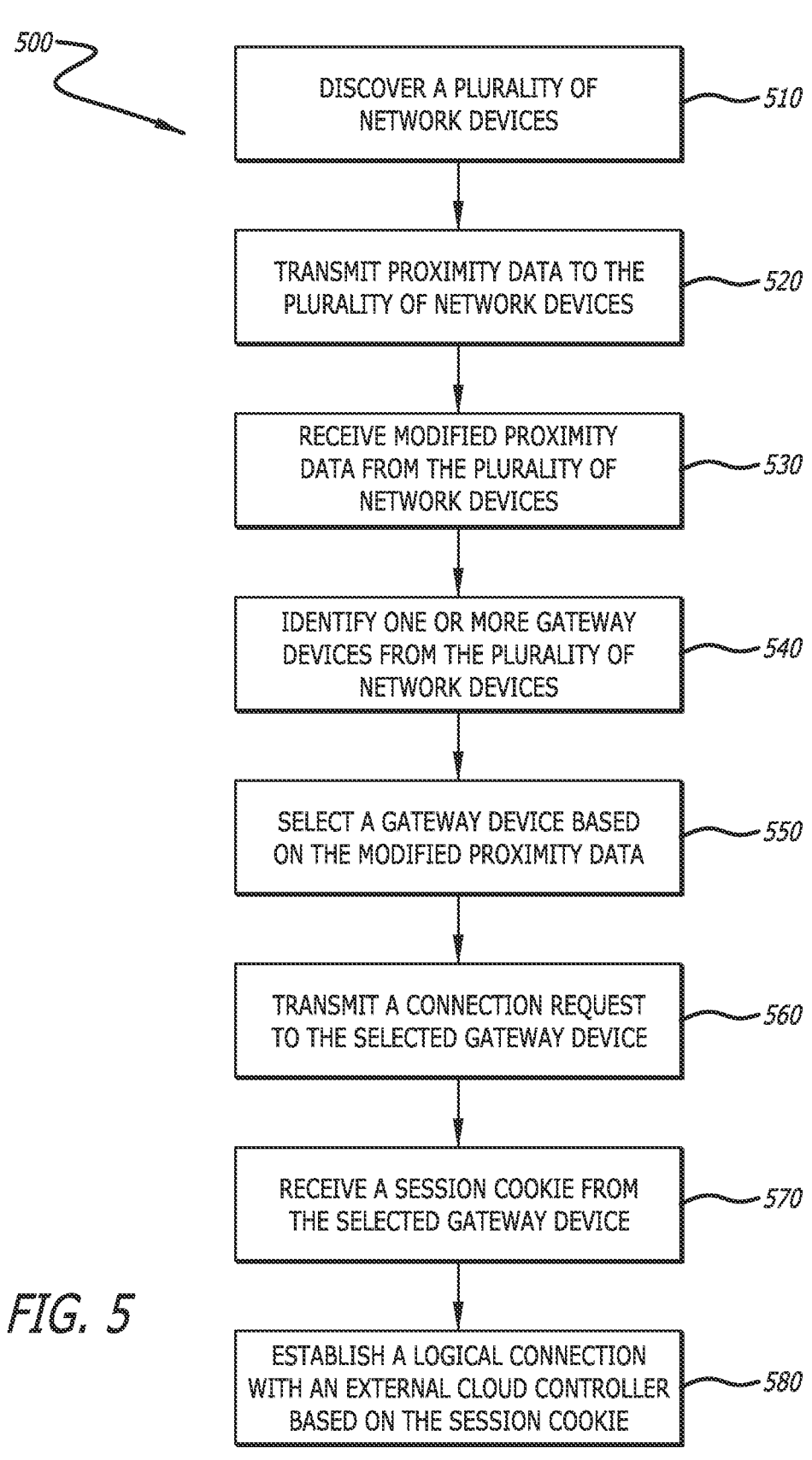

*500*

DISCOVER A PLURALITY OF NETWORK DEVICES — *510*

TRANSMIT PROXIMITY DATA TO THE PLURALITY OF NETWORK DEVICES — *520*

RECEIVE MODIFIED PROXIMITY DATA FROM THE PLURALITY OF NETWORK DEVICES — *530*

IDENTIFY ONE OR MORE GATEWAY DEVICES FROM THE PLURALITY OF NETWORK DEVICES — *540*

SELECT A GATEWAY DEVICE BASED ON THE MODIFIED PROXIMITY DATA — *550*

TRANSMIT A CONNECTION REQUEST TO THE SELECTED GATEWAY DEVICE — *560*

RECEIVE A SESSION COOKIE FROM THE SELECTED GATEWAY DEVICE — *570*

ESTABLISH A LOGICAL CONNECTION WITH AN EXTERNAL CLOUD CONTROLLER BASED ON THE SESSION COOKIE — *580*

SELECT A HASH FUNCTION — *710*

APPLY THE HASH FUNCTION ON THE INTERNET PROTOCOL LINK LOCAL ADDRESS (IP LLA) AND AN INTERFACE NAME OF A DEVICE TO OBTAIN A GATEWAY IDENTIFIER — *720*

SELECT A GATEWAY DEVICE INDICATED BY THE GATEWAY IDENTIFIER — *730*

TRANSMIT A CONNECTION REQUEST TO THE GATEWAY DEVICE — *740*

*800*

INITIATE A PROXY AGENT ON
A DEVICE — *810*

INITIATE A REMOTE PROCEDURE CALL
(RPC) SERVER ON EACH PORT OF THE
DEVICE AND FOR EACH LINK ON EACH
PORT OF THE DEVICE — *820*

RECEIVE A CONNECTION REQUEST
FROM THE NETWORK DEVICE — *830*

PROXY HTTP AND GRPC TRAFFIC ON
EACH PORT OF THE DEVICE — *840*

900

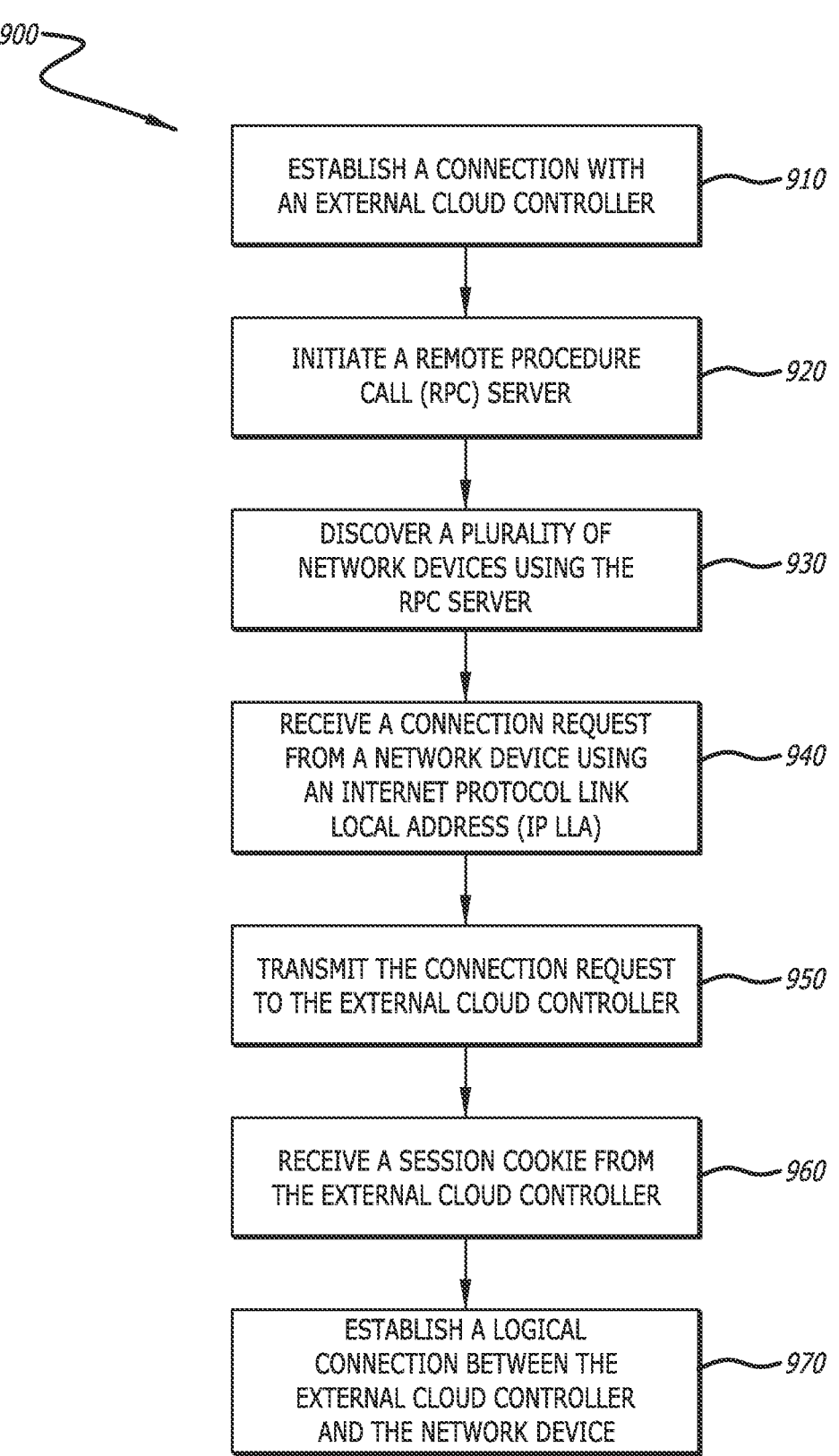

ESTABLISH A CONNECTION WITH
AN EXTERNAL CLOUD CONTROLLER ~ 910

INITIATE A REMOTE PROCEDURE
CALL (RPC) SERVER ~ 920

DISCOVER A PLURALITY OF
NETWORK DEVICES USING THE
RPC SERVER ~ 930

RECEIVE A CONNECTION REQUEST
FROM A NETWORK DEVICE USING
AN INTERNET PROTOCOL LINK
LOCAL ADDRESS (IP LLA) ~ 940

TRANSMIT THE CONNECTION REQUEST
TO THE EXTERNAL CLOUD CONTROLLER ~ 950

RECEIVE A SESSION COOKIE FROM
THE EXTERNAL CLOUD CONTROLLER ~ 960

ESTABLISH A LOGICAL
CONNECTION BETWEEN THE
EXTERNAL CLOUD CONTROLLER
AND THE NETWORK DEVICE ~ 970

*FIG. 9*

DYNAMIC PER-LINK PROXYING OF TRAFFIC BETWEEN INTERCONNECTS OF DEVICES IN A FABRIC

The present disclosure relates to communication networks. More particularly, the present disclosure relates to dynamically proxying traffic between interconnects of devices in a fabric.

BACKGROUND

In large networks, multiple switches are physically mounted within data centers in server racks or cabinets. In some networks, these switches are arranged in three layers: an access layer that includes many access switches that communicate with end-user devices, a distribution layer that aggregates links from multiple access switches, and a core layer that provides high-speed connectivity by routing traffic between various distribution layers. These layers include different types of switches, each designed for a specific purpose. Each switch in each layer plays a vital role in providing traffic routing and network connectivity. Conventionally, each switch is configured individually. The configuration of the switch includes configuration of one or more management ports in the switch. These management ports are often cabled to management networks. In most cases, the management networks are physically and logically separate and facilitate network administrators to access and manage the switches. In that, the management networks can be used by the network administrators to collect real-time data from the switches for identifying performance issues, monitoring security, or troubleshooting the switches and the links between the switches.

However, the configuration of the switches can be complex, often requiring careful attention to detail to ensure proper network connectivity. Such a complexity in the configuration of the switches may lead to potential errors and delays. Additionally, the dependency on a dedicated management network can contribute to increased infrastructure costs. These infrastructure costs can further escalate quickly as the network grows and new switches are added to the network. Moreover, the need for separate cabling for the management ports of the newly added switches can further increase the complexity and the infrastructure costs. Therefore, there is a need for a technique to effectively add new switches to the network while reducing the complexity and the infrastructure costs involved in adding the new switches.

SUMMARY OF THE DISCLOSURE

Systems and methods for dynamically proxying traffic between interconnects of devices in a fabric in accordance with embodiments of the disclosure are described herein. In some embodiments, a device, includes a processor, a memory communicatively coupled to the processor, and a dynamic proxying logic. The logic is configured to discover a plurality of network devices, transmit proximity data to the plurality of network devices, receive modified proximity data from the plurality of network devices, identify one or more gateway devices from the plurality of network devices, select a gateway device from the one or more gateway devices based on the modified proximity data, transmit a connection request to the selected gateway device using an Internet Protocol Link Local Address (IP LLA), receive a session cookie from the selected gateway device, and establish a logical connection with an external cloud controller based on the session cookie.

In some embodiments, the proximity data is indicative of one or more hop counts between the device and one or more network devices of the plurality of network devices, and wherein the modified proximity data is indicative of a plurality of hop counts between the plurality of network devices and the device.

In some embodiments, the selected gateway device has lowest hop count.

In some embodiments, the dynamic proxying logic is further configured to determine the one or more gateway devices having lowest hop count as one or more closest gateway devices, determine a priority assigned to each closest gateway device of the one or more closest gateway devices, and select a closest gateway device, from the one or more closest gateway devices, having highest priority.

In some embodiments, the dynamic proxying logic is further configured to select a hash function, apply the hash function on the IP LLA and an interface name of the device to obtain a gateway identifier, and select the gateway device indicated by the gateway identifier.

In some embodiments, the one or more gateway devices are connected to the external cloud controller by way of an edge router.

In some embodiments, the dynamic proxying logic is further configured to initiate a proxy agent to proxy data traffic on each port of the device.

In some embodiments, the dynamic proxying logic is further configured to initiate a Remote Procedure Call (RPC) server on each port of the device and for each link on each port of the device.

In some embodiments, each link on each port of the device is connected to a network device of the plurality of network devices, and wherein the plurality of network devices are discovered using the RPC server.

In some embodiments, the dynamic proxying logic is further configured to receive the connection request from the network device using the RPC server.

In some embodiments, a device includes a processor, a memory communicatively coupled to the processor, and a dynamic proxying logic. The logic is configured to establish a connection with an external cloud controller, receive a session cookie from the external cloud controller, initiate a Remote Procedure Call (RPC) server, discover a plurality of network devices using the RPC server, receive a connection request from a network device of the plurality of network devices using an Internet Protocol Link Local Address (IP LLA), and transmit the connection request to the external cloud controller.

In some embodiments, the network device establishes a logical connection with the external cloud controller based on the session cookie.

In some embodiments, the device is connected to the external cloud controller by way of an edge router.

In some embodiments, the dynamic proxying logic is further configured to initiate a proxy agent to proxy data traffic on each port of the device.

In some embodiments, the dynamic proxying logic is further configured to initiate the RPC server on each port of the device and for each link on each port of the device.

In some embodiments, a method includes discovering a plurality of network devices, transmitting proximity data to the plurality of network devices, receiving modified proximity data from the plurality of network devices, identifying one or more gateway devices from the plurality of network devices, selecting a gateway device from the one or more gateway devices based on the modified proximity data, transmitting a connection request to the selected gateway device using an Internet Protocol Link Local Address (IP LLA), receiving a session cookie from the selected gateway device, and establishing a logical connection with an external cloud controller based on the session cookie.

In some embodiments, the proximity data is indicative of one or more hop counts for one or more network devices of the plurality of network devices, and wherein the modified proximity data is indicative of a plurality of hop counts for the plurality of network devices.

In some embodiments, the selected gateway device has lowest hop count.

In some embodiments, a method further includes determining the one or more gateway devices having lowest hop count as one or more closest gateway devices, determining a priority assigned to each closest gateway device of the one or more closest gateway devices, and selecting a closest gateway device, from the one or more closest gateway devices, having highest priority.

In some embodiments, a method further includes selecting a hash function, applying the hash function on the IP LLA and an interface name to obtain a gateway identifier, and selecting the gateway device indicated by the gateway identifier.

Other objects, advantages, novel features, and further scope of applicability of the present disclosure will be set forth in part in the detailed description to follow, and in part will become apparent to those skilled in the art upon examination of the following or may be learned by practice of the disclosure. Although the description above contains many specificities, these should not be construed as limiting the scope of the disclosure but as merely providing illustrations of some of the presently preferred embodiments of the disclosure. As such, various other embodiments are possible within its scope. Accordingly, the scope of the disclosure should be determined not by the embodiments illustrated, but by the appended claims and their equivalents.

BRIEF DESCRIPTION OF DRAWINGS

The above, and other, aspects, features, and advantages of several embodiments of the present disclosure will be more apparent from the following description as presented in conjunction with the following several figures of the drawings.

FIG. 5 is a flowchart depicting a process for establishing a logical connection with an external cloud controller, in accordance with various embodiments of the disclosure;

FIG. 9 is a flowchart depicting a process for facilitating a logical connection to an external cloud controller by proxying traffic, in accordance with various embodiments of the disclosure;

Figure 1:
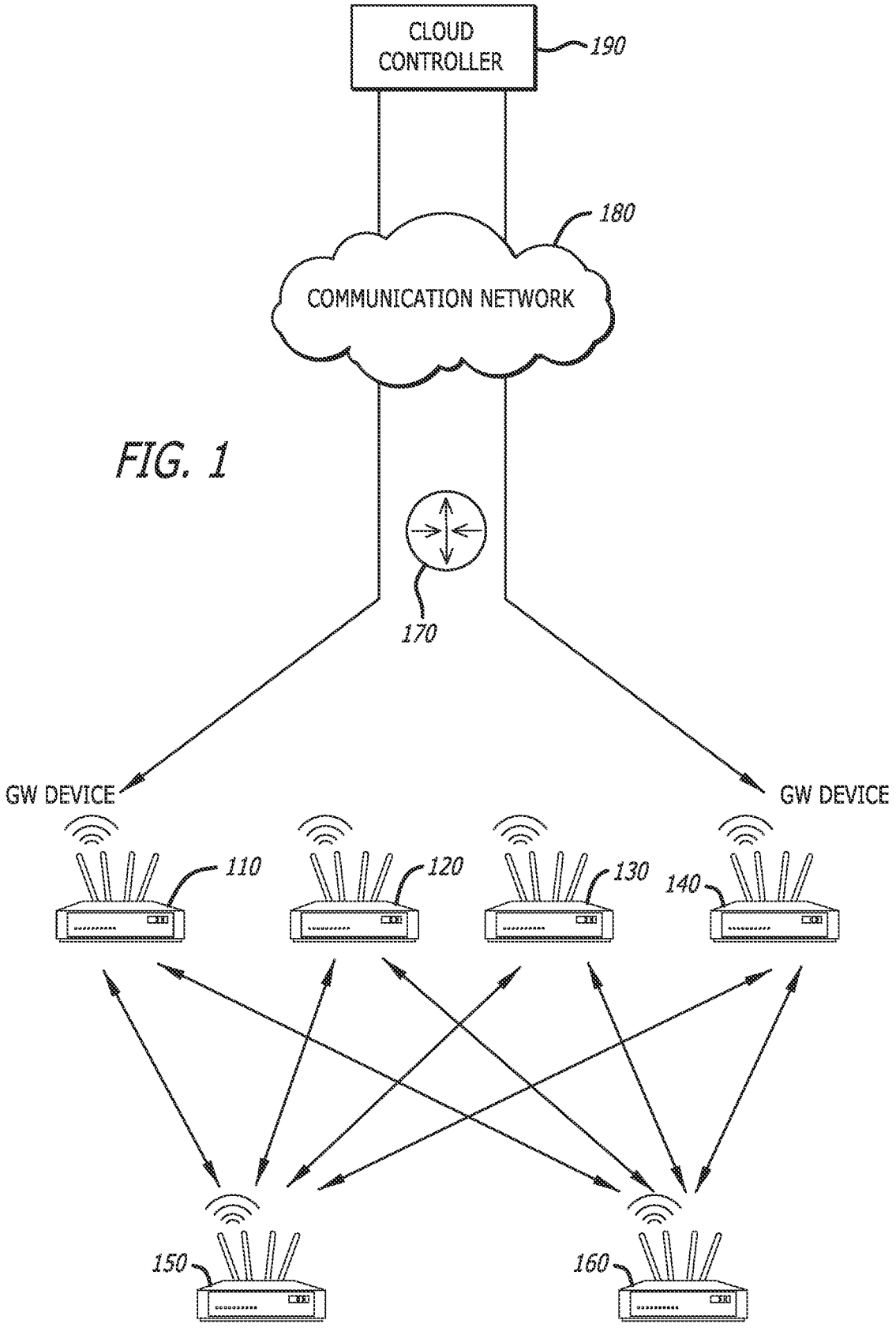
FIG. 1 is a conceptual illustration of a network, in accordance with various embodiments of the disclosure.

Corresponding reference characters indicate corresponding components throughout the several figures of the drawings. Elements in the several figures are illustrated for simplicity and clarity and have not necessarily been drawn to scale. For example, the dimensions of some of the elements in the figures might be emphasized relative to other elements for facilitating understanding of the various presently disclosed embodiments. In addition, common, but well-understood, elements that are useful or necessary in a commercially feasible embodiment are often not depicted in order to facilitate a less obstructed view of these various embodiments of the present disclosure.

DETAILED DESCRIPTION

In response to the issues described above, devices and methods are discussed herein that dynamically proxy traffic between interconnects of devices in a fabric. In a communication network having multiple network devices, only a few network devices may be directly connected to an external cloud controller, thereby acting as gateway devices or exit nodes for the communication network. A gateway device can discover the external cloud controller and then establish a connection with the external cloud controller. The network devices may initiate a proxy agent for each port to proxy or forward an incoming data traffic using an Internet Protocol Link Local Address (IP LLA). In some embodiments, IPV6 LLA may be utilized. In that, each network interface or link may be assigned a unique IPV6 LLA which can be utilized to identify and communicate with the proxy agents running on the network devices in the link. In certain embodiments, the proxy agents may forward, both: Hypertext Transfer Protocol (HTTP) data traffic and gRPC data traffic. In more embodiments, the external cloud controller may be a SaaS (Software as a Service) controller. On booting, the network devices can discover other network devices in the communication network using a Remote Procedure Call (RPC). In some more embodiments, the network devices may initiate an RPC server on each port and each link on each port. In numerous embodiments, the gateway device can be connected to the external cloud controller by way of an edge router.

In many embodiments, a device in the communication network may discover a plurality of network devices in the communication network. The device can transmit proximity data to one or more network devices that are in communication with the device. The proximity data may indicate a number of hop counts between the device and the one or more network devices connected to the device. The device may further receive modified proximity data from the plurality of network devices. The modified proximity data can indicate the number of hop counts between the plurality of network devices and the device. Hence, the device may obtain information of distances of the device from the plurality of network devices in the communication network. The device can identify one or more gateway devices from the plurality of network devices. The device may select a gateway device from the one or more gateway devices. The device can transmit a connection request to the selected gateway device to connect to the external cloud controller by utilizing the IP LLA. In some embodiments, the selected gateway device may perform local authentication with the external cloud controller. The selected gateway device can, thereafter, forward the connection request to the external cloud controller and may further receive a session cookie from the external cloud controller. In certain embodiments, the proxy agent running on the gateway device may receive and forward the connection request by utilizing the RPC server initiated on one or more ports of the gateway device. The device may establish a logical connection with the external cloud controller based on the session cookie. In this logical connection, the selected gateway device can forward incoming data traffic from the device to the external cloud controller and incoming data traffic from the external cloud controller to the device, thereby facilitating the logical connection between the device and the external cloud controller.

In a number of embodiments, if the device is not directly connected to any gateway device, the device can select a closest network device running the proxy agent based on the modified proximity data. In that, the device can select the network device having lowest hop count as the closest network device. The device may transmit the connection request to the closest network device. The closest network device may then select a gateway device and forward the connection request to the gateway device. The gateway device can, thereafter, forward the connection request to the external cloud controller and receive the session cookie. The device may establish a logical connection with the external cloud controller based on the session cookie. In this logical connection, the closest network device may forward the incoming data traffic from the device to the gateway device and the incoming data traffic from the gateway device to the device, thereby facilitating the logical connection between the device and the external cloud controller. Hence, the proxy agents running on the network devices facilitate forwarding the incoming data traffic from the device hop-by-hop until the incoming data traffic from the device reaches the gateway device.

In various embodiments, the device may select a closest gateway device based on the modified proximity data. In that, the device can select a gateway device having the lowest hop count as the closest gateway device. The device may forward the connection request to the closest gateway device. If the device determines that there exist more than one closest gateway devices having the lowest hop count, the device may determine priorities assigned to the one or more closest gateway devices. Thereafter, the device can select the closest gateway device having highest priority. In some embodiments, the device can select a hash function and apply the hash function on the IP LLA and an interface name of the device to obtain a gateway identifier. The device may then select the gateway device indicated by the gateway identifier.

Advantageously, if the device is newly added to an existing communication network, utilizing proxying agents to forward the incoming data traffic from the device may remove a requirement of using a management network. Therefore, complexity and infrastructure costs involved in adding the device to the existing communication network may be significantly reduced. The utilization of the gRPC calls can provide efficient and secure communication between the device and the network devices or the gateway devices in the existing communication network. The utilization of the certificate-based local authentication facilitates secure and trusted communication between the device and the external cloud controller. Since the proxy agents can forward both: HTTP and gRPC data traffic, the communication network can provide versatility of the data traffic and ensure that various types of communication can be proxied through the communication network. Thus, the dynamic per-link proxying of the data traffic can provide easy scalability of the existing communication network, reduce the complexity and infrastructure costs involved in expanding the existing communication network, provide security for the data traffic, and facilitate versatility in the type of the data traffic, thereby providing multiple technical and economical advantages over conventional communication networks.

Aspects of the present disclosure may be embodied as an apparatus, system, method, or computer program product. Accordingly, aspects of the present disclosure may take the form of an entirely hardware embodiment, an entirely software embodiment (including firmware, resident software, micro-code, or the like) or an embodiment combining software and hardware aspects that may all generally be referred to herein as a "function," "module," "apparatus," or "system.". Furthermore, aspects of the present disclosure may take the form of a computer program product embodied in one or more non-transitory computer-readable storage media storing computer-readable and/or executable program code. Many of the functional units described in this specification have been labeled as functions, in order to emphasize their implementation independence more particularly. For example, a function may be implemented as a hardware circuit comprising custom VLSI circuits or gate arrays, off-the-shelf semiconductors such as logic chips, transistors, or other discrete components. A function may also be implemented in programmable hardware devices such as via field programmable gate arrays, programmable array logic, programmable logic devices, or the like.

Functions may also be implemented at least partially in software for execution by various types of processors. An identified function of executable code may, for instance, comprise one or more physical or logical blocks of computer instructions that may, for instance, be organized as an object, procedure, or function. Nevertheless, the executables of an identified function need not be physically located together but may comprise disparate instructions stored in different locations which, when joined logically together, comprise the function and achieve the stated purpose for the function.

Indeed, a function of executable code may include a single instruction, or many instructions, and may even be distributed over several different code segments, among different programs, across several storage devices, or the like. Where a function or portions of a function are implemented in software, the software portions may be stored on one or more computer-readable and/or executable storage media. Any combination of one or more computer-readable storage media may be utilized. A computer-readable storage medium may include, for example, but not limited to, an electronic, magnetic, optical, electromagnetic, infrared, or semiconductor system, apparatus, or device, or any suitable combination of the foregoing, but would not include propagating signals. In the context of this document, a computer readable and/or executable storage medium may be any tangible and/or non-transitory medium that may contain or store a program for use by or in connection with an instruction execution system, apparatus, processor, or device.

Computer program code for carrying out operations for aspects of the present disclosure may be written in any combination of one or more programming languages, including an object-oriented programming language such as Python, Java, Smalltalk, C++, C#, Objective C, or the like, conventional procedural programming languages, such as the "C" programming language, scripting programming languages, and/or other similar programming languages. The program code may execute partly or entirely on one or more of a user's computer and/or on a remote computer or server over a data network or the like.

A component, as used herein, comprises a tangible, physical, non-transitory device. For example, a component may be implemented as a hardware logic circuit comprising custom VLSI circuits, gate arrays, or other integrated circuits; off-the-shelf semiconductors such as logic chips, transistors, or other discrete devices; and/or other mechanical or electrical devices. A component may also be implemented in programmable hardware devices such as field programmable gate arrays, programmable array logic, programmable logic devices, or the like. A component may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may alternatively be embodied by or implemented as a component.

A circuit, as used herein, comprises a set of one or more electrical and/or electronic components providing one or more pathways for electrical current. In certain embodiments, a circuit may include a return pathway for electrical current, so that the circuit is a closed loop. In another embodiment, however, a set of components that does not include a return pathway for electrical current may be referred to as a circuit (e.g., an open loop). For example, an integrated circuit may be referred to as a circuit regardless of whether the integrated circuit is coupled to ground (as a return pathway for electrical current) or not. In various embodiments, a circuit may include a portion of an integrated circuit, an integrated circuit, a set of integrated circuits, a set of non-integrated electrical and/or electrical components with or without integrated circuit devices, or the like. In one embodiment, a circuit may include custom VLSI circuits, gate arrays, logic circuits, or other integrated circuits; off-the-shelf semiconductors such as logic chips, transistors, or other discrete devices; and/or other mechanical or electrical devices. A circuit may also be implemented as a synthesized circuit in a programmable hardware device such as field programmable gate array, programmable array logic, programmable logic device, or the like (e.g., as firmware, a netlist, or the like). A circuit may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may be embodied by or implemented as a circuit.

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising,"

"having," and variations thereof mean "including but not limited to", unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Further, as used herein, reference to reading, writing, storing, buffering, and/or transferring data can include the entirety of the data, a portion of the data, a set of the data, and/or a subset of the data. Likewise, reference to reading, writing, storing, buffering, and/or transferring non-host data can include the entirety of the non-host data, a portion of the non-host data, a set of the non-host data, and/or a subset of the non-host data.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C.". An exception to this definition will occur only when a combination of elements, functions, steps, or acts are in some way inherently mutually exclusive.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

In the following detailed description, reference is made to the accompanying drawings, which form a part thereof. The foregoing summary is illustrative only and is not intended to be in any way limiting. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

Referring to FIG. 1, a conceptual illustration of a network 100, in accordance with various embodiments of the disclosure is shown. The network 100 may include a plurality of switches or network devices 110-160, a router 170, a communication network 180, and an external cloud controller 190. The network devices 110 and 140 can be gateway devices 110 and 140 that are directly connected to the external cloud controller 190 by way of the router 170 and the communication network 180. In some embodiments, the router 170 may be an edge router. In certain embodiments, the communication network 180 can be internet. In more embodiments, the gateway devices 110 and 140 may function as exit nodes for the network 100.

In many embodiments, the network devices 110-160 may have one or more ports. Each port can have one or more interfaces or links. The interfaces may be connected to other network devices in the network 100. Each interface can be uniquely identified by an Internet Protocol Link Local Address (IP LLA). The network devices 110-160 may initiate a proxy agent for each port. The proxy agent for each port can forward incoming data traffic on that port to another network device or gateway device by utilizing the IP LLA. The gateway devices 110 and 140 may forward the incoming data traffic to the external cloud controller 190. The network devices 110-160 can also initiate a Remote Procedure Call (RPC) server on each port. The network devices 110-160 may utilize the RPC server to discover all network devices in the network 100. The incoming data traffic from one network device may be forwarded by other network devices hop-by-hop until the data traffic reaches one gateway device.

Although a specific embodiment for the network 100 for carrying out the various steps, processes, methods, and operations described herein is discussed with respect to FIG. 1, any of a variety of systems and/or processes may be utilized in accordance with embodiments of the disclosure. For example, the network 100 may facilitate proxying incoming data traffic from a device newly added to the network 100. The elements depicted in FIG. 1 may also be interchangeable with other elements of FIGS. 2-10 as required to realize a particularly desired embodiment.

Figure 2:
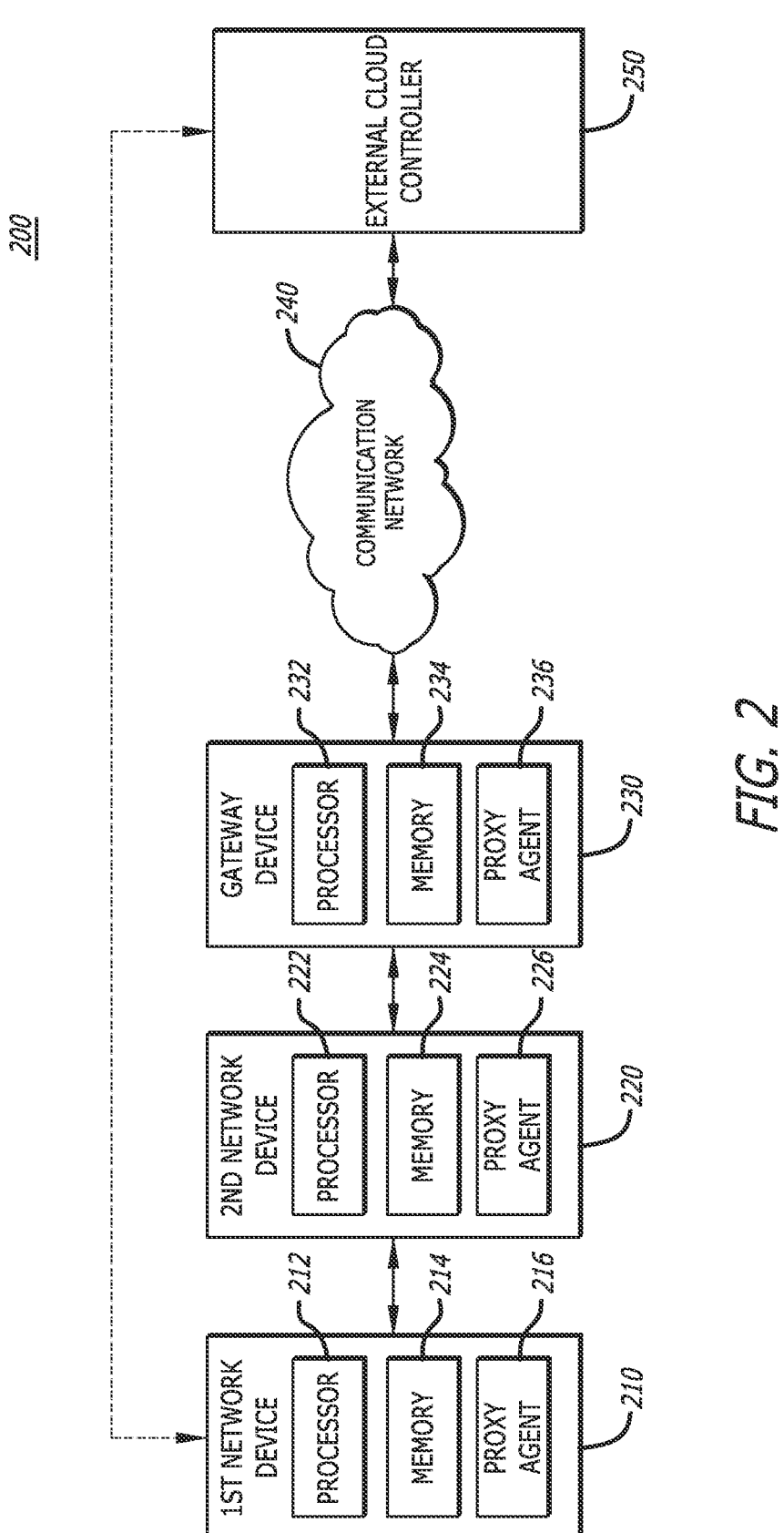
FIG. 2 is a conceptual illustration of proxying data traffic between devices in a network, in accordance with various embodiments of the disclosure.

Referring to FIG. 2, a conceptual illustration of proxying data traffic between devices in a network 200, in accordance with various embodiments of the disclosure is shown. The network 200 may include a first network device 210, a second network device 220, a gateway device 230, a communication network 240, and an external cloud controller 250. The first network device 210 can be connected to the second network device 220. The second network device 220 may be connected to the gateway device 230. The gateway device 230 can be connected to the external cloud controller 250 by way of the communication network 240.

In many embodiments, the first network device 210 may discover a plurality of network devices or gateway devices in the network 200 by utilizing the RPC server. The first network device 210 can transmit proximity data to one or more network devices that are connected to the first network device 210. The proximity data may indicate a number of hop counts between the first network device 210 and the one or more network devices. The first network device 210 can receive modified proximity data from the plurality of network devices or one of the plurality of network devices. The modified proximity data may indicate a number of hop counts between the plurality of network devices and the first network device 210. The first network device 210 can utilize the modified proximity data to determine distances between the first network device 210 and the plurality of network devices in the network 200. In some embodiments, the modified proximity data may include additional information about the plurality of network devices, such as, but not limited to, device identifiers, device types, whether the network devices are gateway devices, or whether the network devices run the proxy agent. If the first network device 210 is directly connected to any gateway device, the first network device 210 may select the gateway device and transmit a connection request to the gateway device. If the first network device 210 is not directly connected to any gateway device, the first network device 210 may select a closest network device based on the modified proximity data. In certain embodiments, the first network device 210 may select the second network device 220 as the closest network device. In more embodiments, the first network device 210, the second network device 220, and the gateway device 230 can run the proxy agent to forward data traffic on each port.

In various embodiments, the first network device 210 transmits the connection request to the second network device 220 utilizing the IP LLA or the RPC. The second network device 220 may forward the connection request to the gateway device 230 utilizing the IP LLA or the RPC. The gateway device 230 can establish a connection with the external cloud controller 250. The gateway device 230 can perform a local certificate-based authentication with the external cloud controller 250 and can further receive a session cookie from the external cloud controller 250. The gateway device 230 may forward the connection request to the external cloud controller 250. The first network device 210 may then establish a logical connection with the external cloud controller 250. The gateway device 230 can forward incoming data traffic from the second network device 220 to the external cloud controller 250 and incoming data traffic from the external cloud controller 250 to the second network device 220. The second network device 220 can forward incoming data traffic from the gateway device 230 to the first network device 210 and incoming data traffic from the first network device 210 to the gateway device 230. In some embodiments, the logical connection utilizes IP LLA to proxy the data traffic over the interface.

Although a specific embodiment for the network 200 for carrying out the various steps, processes, methods, and operations described herein is discussed with respect to FIG. 2, any of a variety of systems and/or processes may be utilized in accordance with embodiments of the disclosure. For example, the network 200 may facilitate dynamic hop-by-hop per-link proxying of the data traffic until the data traffic reaches an exit node. The elements depicted in FIG. 2 may also be interchangeable with other elements of FIG. 1 and FIGS. 3-10 as required to realize a particularly desired embodiment.

Figure 3:
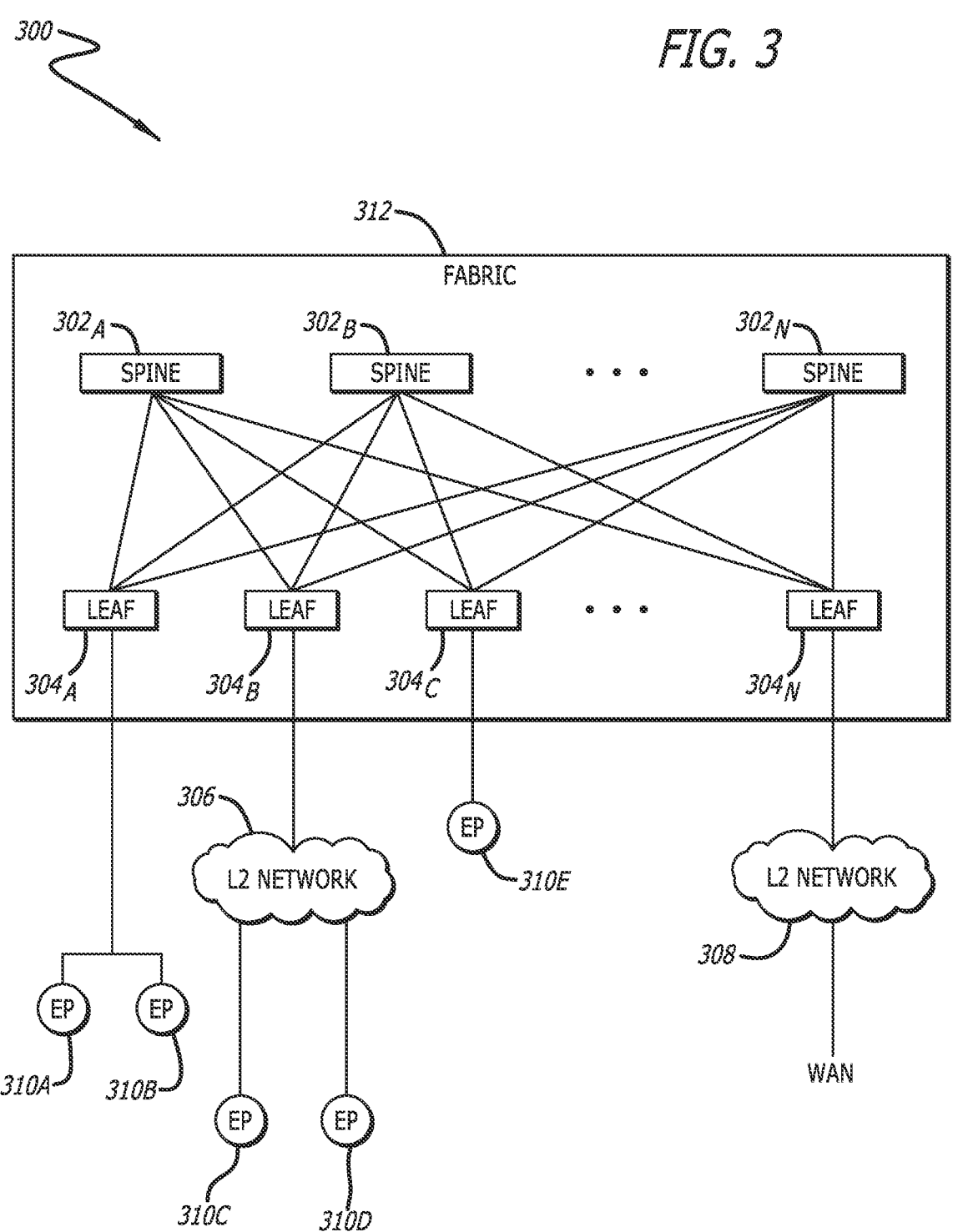
FIG. 3 is a schematic block diagram of an example architecture for a network fabric, in accordance with various embodiments of the disclosure.

Referring to FIG. 3, a schematic block diagram of an example architecture 300 for a network fabric 312, in accordance with various embodiments of the disclosure is shown. The network fabric 312 can include spine switches $302_A$, $302_B$, . . . , $302_N$ (collectively "302") connected to leaf switches $304_A$, $304_B$, $304_C$ . . . $304_N$ (collectively "304") in the network fabric 312. As those skilled in the art will recognize, the network fabric 312 can refer to a high-speed, high-bandwidth interconnect system that enables multiple devices to communicate with each other efficiently and reliably. It is a network topology that is designed to provide a flexible and scalable infrastructure for data centers, cloud environments, and other network elements.

Various embodiments described herein can include a leaf-spine architecture comprising a plurality of spine switches and leaf switches. Spine switches 302 can be L3 switches in the fabric 312. However, in some cases, the spine switches 302 can also, or otherwise, perform L2 functionalities. Further, the spine switches 302 can support various capabilities, such as, but not limited to, 40 or 10 Gbps Ethernet speeds. To this end, the spine switches 302 can be configured with one or more 40 Gigabit Ethernet ports. In certain embodiments, each port can also be split to support other speeds. For example, a 40 Gigabit Ethernet port can be split into four 10 Gigabit Ethernet ports, although a variety of other combinations are available.

In many embodiments, one or more of the spine switches 302 can be configured to host a proxy function that performs a lookup of the endpoint address identifier to locator mapping in a mapping database on behalf of leaf switches 304 that do not have such mapping. The proxy function can do this by parsing through the packet to the encapsulated tenant packet to get to the destination locator address of the tenant. The spine switches 302 can then perform a lookup of their local mapping database to determine the correct locator address of the packet and forward the packet to the locator address without changing certain fields in the header of the packet.

In various embodiments, when a packet is received at a spine switch $302_i$, wherein subscript "i" indicates that this operation may occur at any spine switch $302_A$ to $302_N$, the spine switch $302_i$ can first check if the destination locator address is a proxy address. If so, the spine switch $302_i$ can perform the proxy function as previously mentioned. If not, the spine switch $302_i$ can look up the locator in its forwarding table and forward the packet accordingly.

In a number of embodiments, one or more spine switches 302 can connect to one or more leaf switches 304 within the fabric 312. Leaf switches 304 can include access ports (or non-fabric ports) and fabric ports. Fabric ports can provide uplinks to the spine switches 302, while access ports can provide connectivity for devices, hosts, endpoints, VMs, or external networks to the fabric 312.

In more embodiments, leaf switches 304 can reside at the edge of the fabric 312, and can thus represent the physical network edge. In some cases, the leaf switches 304 can be top-of-rack ("ToR") switches configured according to a ToR architecture. In other cases, the leaf switches 304 can be aggregation switches in any particular topology, such as end-of-row (EoR) or middle-of-row (MoR) topologies. The leaf switches 304 can also represent aggregation switches, for example.

In additional embodiments, the leaf switches 304 can be responsible for routing and/or bridging various packets and applying network policies. In some cases, a leaf switch can perform one or more additional functions, such as implementing a mapping cache, sending packets to the proxy function when there is a miss in the cache, encapsulate packets, enforce ingress or egress policies, etc. Moreover, the leaf switches 304 can contain virtual switching functionalities, such as a virtual tunnel endpoint (VTEP) function.

In further embodiments, network connectivity in the fabric 312 can flow through the leaf switches 304. Here, the leaf switches 304 can provide servers, resources, endpoints, external networks, or VMs access to the fabric 312, and can connect the leaf switches 304 to each other. In some cases, the leaf switches 304 can connect endpoint groups to the fabric 312 and/or any external networks. Each endpoint group can connect to the fabric 312 via one of the leaf switches 304, for example.

Endpoints 310 A-E (collectively "310", shown as "EP") can connect to the fabric 312 via leaf switches 304. For example, endpoints 310A and 310B can connect directly to leaf switch $304_A$, which can connect endpoints 310A and 310B to the fabric 312 and/or any other one of the leaf switches 304. Similarly, endpoint 310E can connect directly to leaf switch 304C, which can connect endpoint 310E to the fabric 312 and/or any other of the leaf switches 304. On the other hand, endpoints 310C and 310D can connect to leaf switch $304_B$ via L2 network 306. Similarly, the wide area network (WAN) can connect to the leaf switches 304C or 304D via L3 network 308.

In certain embodiments, endpoints 310 can include any communication device, such as a computer, a server, a switch, a router, etc. In addition, the endpoints 310 can host virtual workload(s), clusters, and applications or services, which can connect with the fabric 312 or any other device or network, including an external network.

Although a specific embodiment for an architecture 300 is described above with respect to FIG. 3, any of a variety of systems and/or processes may be utilized in accordance with embodiments of the disclosure. For example, the architecture 300 could comprise any variety of endpoints, spine switches, and/or leaf switches. The elements depicted in FIG. 3 may also be interchangeable with other elements of FIGS. 1-2 and 4-10 as required to realize a particularly desired embodiment.

Figure 4:
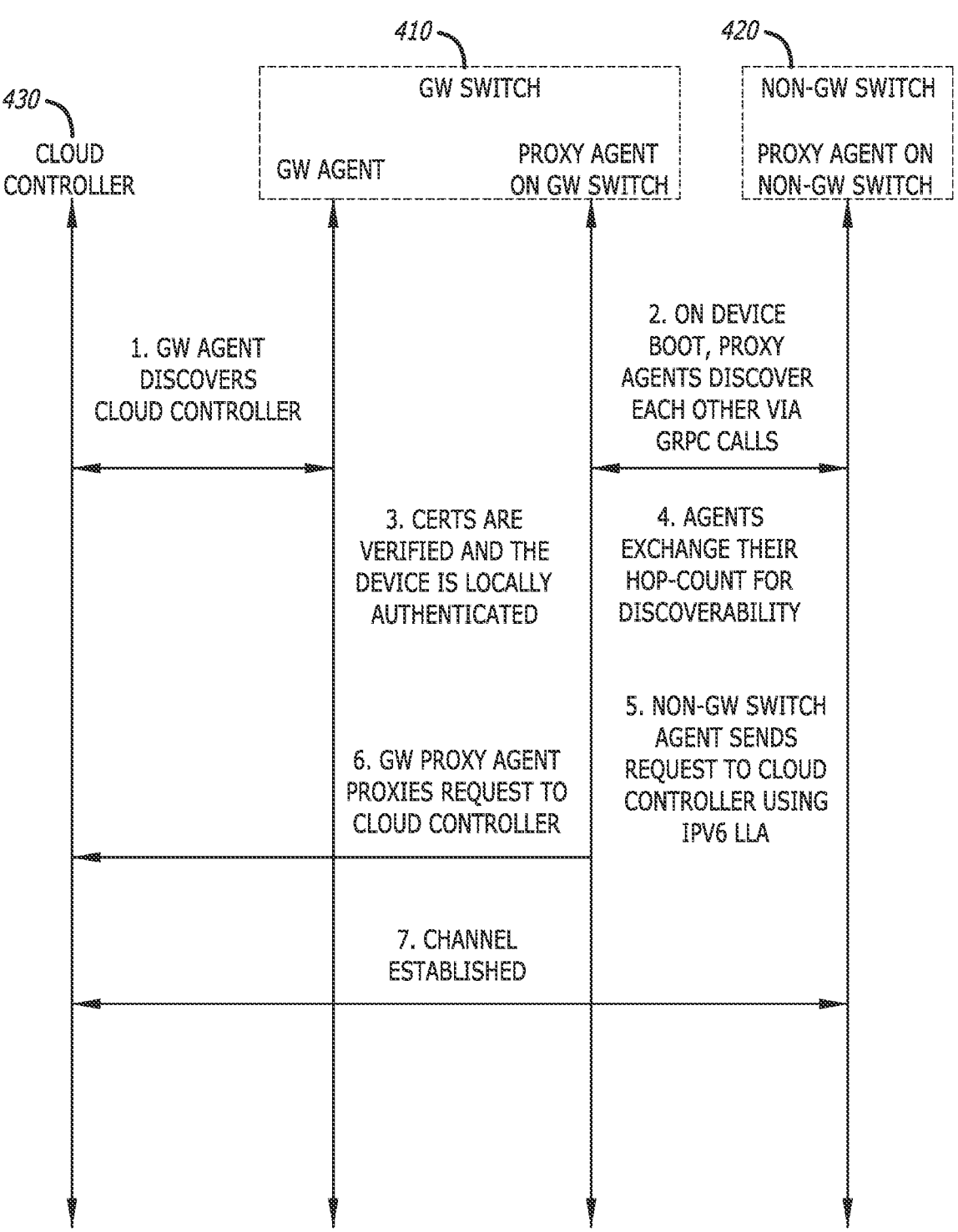
FIG. 4 is a conceptual illustration of a process for proxying traffic between devices in a communication network, in accordance with various embodiments of the disclosure.

Referring to FIG. 4, a conceptual illustration of a process 400 for proxying traffic between devices in a communication network, in accordance with various embodiments of the disclosure is shown. In many embodiments, the process 400 may be performed between a gateway switch 410, a non-gateway switch 420, and a cloud controller 430. In some embodiments, the gateway switch 410 and the non-gateway switch 420 can run proxy agents to proxy data traffic on each port. In certain embodiments, the communication network may include multiple switches including the gateway switch 410 and the non-gateway switch 420. In more embodiments, the gateway switch 410 can be connected to the cloud controller 430. In some more embodiments, the non-gateway switch 420 may be connected to the gateway switch 410.

In a number of embodiments, the gateway switch 410 may discover the cloud controller 430 (step 1). In some embodiments, the gateway switch 410 can be connected to the cloud controller 430 by way of the router. In certain embodiments, the gateway switch 410 may function as an exit node for the communication network. In more embodiments, the cloud controller 430 can be a SaaS (Software as a Service) controller.

In various embodiments, all switches in the communication network can discover each other by way of gRPCs (step 2). In some embodiments, all the switches in the communication network may run proxy agents to proxy data traffic on each of their ports. In certain embodiments, all the switches in the communication network may also initiate gRPC servers on all their ports. In more embodiments, every switch in the communication network may discover other switches in the communication network by utilizing the respective proxy agents. In some more embodiments, the non-gateway switch 420 and the gateway switch 410 discover each other by way of gRPC between the proxy agents running on the non-gateway switch 420 and the gateway switch 410.

In additional embodiments, the gateway switch 410 may establish the connection with the cloud controller 430 (step 3). In some embodiments, the gateway switch 410 can perform local certificate-based authentication. In certain embodiments, the gateway switch 410 may further authenticate another switch to establish communication with the cloud controller 430. In more embodiments, the gateway switch 410 can utilize one or more secure authentication protocols to ensure that the data traffic can be securely transmitted to the cloud controller 430.

In further embodiments, the switches can exchange their hop-count data for discoverability (step 4). In some embodiments, the non-gateway switch 420 may transmit the proximity data to the other switches in the communication network. In certain embodiments, the non-gateway switch 420 can receive the modified proximity data from one or more switches in the communication network. In more embodiments, the non-gateway switch 420 may identify the gateway switch 410 as the closest gateway switch based on the modified proximity data.

In many more embodiments, the non-gateway switch 420 may transmit the connection request (step 5). In some embodiments, the connection request can be a request by the non-gateway switch 420 to connect to the cloud controller 430. In certain embodiments, the non-gateway switch 420 can transmit the connection request by utilizing the IP LLA.

In many additional embodiments, the gateway switch 410 can proxy the connection request to the cloud controller (step 6). In some embodiments, the proxy agent running on the gateway switch 410 may receive the connection request on the port that is connected to the non-gateway switch 420 by utilizing the IP LLA. In certain embodiments, the cloud controller 430 can transmit the session cookie to the gateway switch 410. In more embodiments, the proxy agent running on the gateway switch 410 may proxy the session cookie to the non-gateway switch 420 by utilizing the IP LLA.

In many further embodiments, the non-gateway switch 420 may establish the logical connection with the cloud controller 430 based on the session cookie (step 7). In some embodiments, the logical connection between the non-gateway switch 420 and the cloud controller 430 can be established through the gateway switch 410 by utilizing the IP LLA. In certain embodiments, the gateway switch 410 can proxy the data traffic between the cloud controller 430 and the non-gateway switch 420 through the proxy agent running on the gateway switch 410.

Although a specific embodiment for the process 400 for carrying out the various steps, processes, methods, and operations described herein is discussed with respect to FIG. 4, any of a variety of systems and/or processes may be utilized in accordance with embodiments of the disclosure. For example, the process 400 may facilitate logical connections between the cloud controller 430 and one or more non-gateway devices external to the communication network. The elements depicted in FIG. 4 may also be interchangeable with other elements of FIGS. 1-3 and FIGS. 5-10 as required to realize a particularly desired embodiment.

Referring to FIG. 5, a flowchart depicting a process 500 for establishing the logical connection with the external cloud controller, in accordance with various embodiments of the disclosure is shown. In many embodiments, the process 500 may discover the plurality of network devices in the network (block 510). In some embodiments, the process 500 can utilize the gRPC server initiated on the ports of the network devices to discover the plurality of network devices. In certain embodiments, the network devices may be switches. In more embodiments, few of the network devices can be gateway devices or exit nodes of the network. In some more embodiments, the process 500 may be performed by a non-gateway network device or a network device that is not connected to the external cloud controller.

In a number of embodiments, the process 500 can transmit the proximity data to the plurality of network devices (block 520). In some embodiments, the process 500 can transmit the proximity data to one more network devices that are in direct communication. In certain embodiments, the proximity data may indicate the hop count to the one or more network devices.

In various embodiments, the process 500 may receive the modified proximity data from the plurality of network devices (block 530). In some embodiments, the modified proximity data can indicate the hop counts for all the network devices in the communication network. In certain embodiments, the process 500 may determine distances from all the network devices in the communication network based on the modified proximity data.

In additional embodiments, the process 500 can identify the one or more gateway devices from the plurality of network devices (block 540). In some embodiments, the modified proximity data can include additional information about the network devices in the communication network. In certain embodiments, the additional information may include the device identifier, whether the network device is a gateway device, the capabilities of the network device, for example. In more embodiments, the process 500 may identify the one or more gateway devices from the plurality of network devices based on the additional information included in the modified proximity data.

In further embodiments, the process 500 may select one gateway device based on the modified proximity data (block 550). In certain embodiments, the process 500 can select the gateway device that has the lowest hop count. In more embodiments, the process 500 may select the gateway device by applying a hash function on an IP LLA and an interface name of the network device. In some more embodiments, the process 500 can select the closest gateway device from the one or more closest gateway devices having highest priority.

In many more embodiments, the process 500 can transmit the connection request to the selected gateway device (block 560). In some embodiments, the process 500 may utilize the IP LLA to transmit the connection request to the selected gateway device. In certain embodiments, the connection request can be the request to connect to the external cloud controller.

In many additional embodiments, the process 500 may receive the session cookie from the selected gateway device (block 570). In some embodiments, the selected gateway device can proxy the connection request to the external cloud controller. In certain embodiments, the selected gateway device may receive the session cookie from the external cloud controller in response to the connection request. In more embodiments, the selected gateway device may proxy the session cookie to the process 500 by utilizing the IP LLA.

In many further embodiments, the process 500 can establish the logical connection with the external cloud controller based on the session cookie (block 580). In some embodiments, the logical connection may be through the selected gateway device. In certain embodiments, the logical connection can be through the selected gateway device and one or more intermediate network devices. In more embodiments, the selected gateway device may proxy the data traffic between the external cloud controller and the non-gateway network device by utilizing the IP LLA.

Although a specific embodiment for the process 500 for carrying out the various steps, processes, methods, and operations described herein is discussed with respect to FIG. 5, any of a variety of systems and/or processes may be utilized in accordance with embodiments of the disclosure. For example, the process 500 may facilitate the logical connection between the non-gateway network device and the external cloud controller. The elements depicted in FIG. 5 may also be interchangeable with other elements of FIGS. 1-4 and FIGS. 6-10 as required to realize a particularly desired embodiment.

Figure 6:
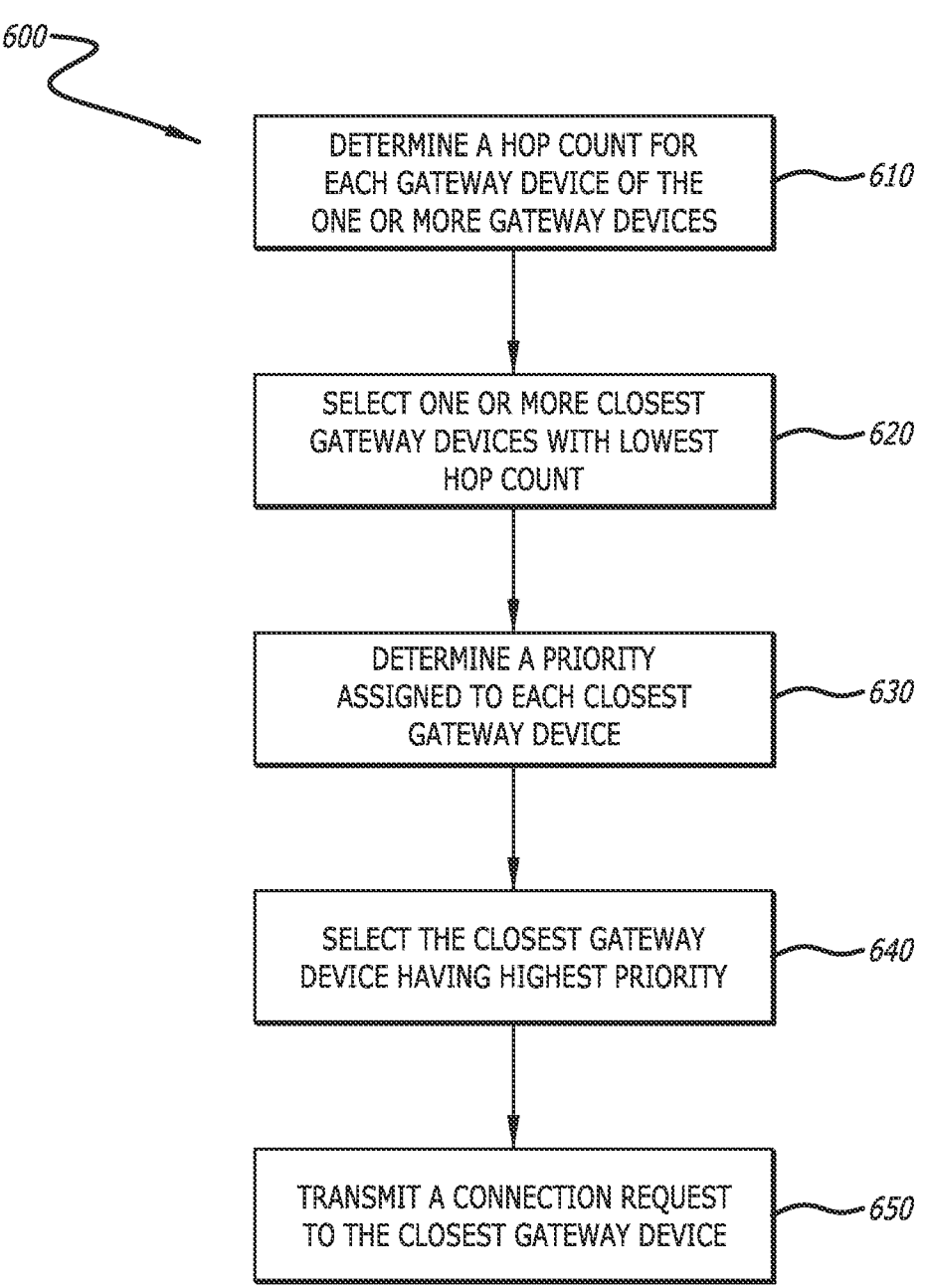
FIG. 6 is a flowchart depicting a process for transmitting a connection request to a gateway device based on a priority of the gateway device, in accordance with various embodiments of the disclosure.

Referring to FIG. 6, a flowchart depicting a process 600 for transmitting the connection request to the gateway device based on the priority of the gateway device, in accordance with various embodiments of the disclosure is shown. In many embodiments, the process 600 may determine the hop counts for each gateway device of the one or more gateway devices (block 610). In some embodiments, the hop counts may be retrieved from the modified proximity data. In certain embodiments, the process 600 can determine distances from each gateway device based on the modified proximity data.

In a number of embodiments, the process 600 can select the one or more closest gateway devices (block 620). In some embodiments, the one or more closest gateway devices can be the gateway devices having the lowest hop count. In certain embodiments, all the closest gateway devices may be connected to the external cloud controller.

In various embodiments, the process 600 may determine the priority assigned to each closest gateway device of the one or more closest gateway devices (block 630). In some embodiments, the one or more closest gateway devices may have different priorities to achieve efficient link utilization. In certain embodiments, the closest gateway device having higher load or higher data traffic may have lower priority whereas the closest gateway device having lower load or lower data traffic may have higher priority. In more embodiments, the assignment of priorities can provide efficient utilization of the gateway devices and avoid network congestion.

In additional embodiments, the process 600 may select the closest gateway device having the highest priority (block 640). In some embodiments, if more than one of the closest gateway devices have the highest priority, the process 600 may select the closest gateway device using simple round-robin selection. In certain embodiments, the process 600 can also select the closest gateway device using the simple round-robin selection in absence of priority information of the gateway devices or when there is no priority assigned to the gateway devices.

In further embodiments, the process 600 can transmit the connection request to the closest gateway device having the highest priority (block 650). In some embodiments, the closest gateway device can proxy the connection request to the external cloud controller. In certain embodiments, the closest gateway device may receive the session cookie from the external cloud controller in response to the connection request. In more embodiments, the closest gateway device may proxy the session cookie to the process 600 by utilizing the IP LLA. In some more embodiments, the process 600 can establish the logical connection with the external cloud controller based on the session cookie.

Although a specific embodiment for the process 600 for carrying out the various steps, processes, methods, and operations described herein is discussed with respect to FIG. 6, any of a variety of systems and/or processes may be utilized in accordance with embodiments of the disclosure. For example, the process 600 may provide efficient link utilization by routing traffic to the gateway devices based on their assigned priorities. The elements depicted in FIG. 6 may also be interchangeable with other elements of FIGS. 1-5 and FIGS. 7-10 as required to realize a particularly desired embodiment.

Figure 7:
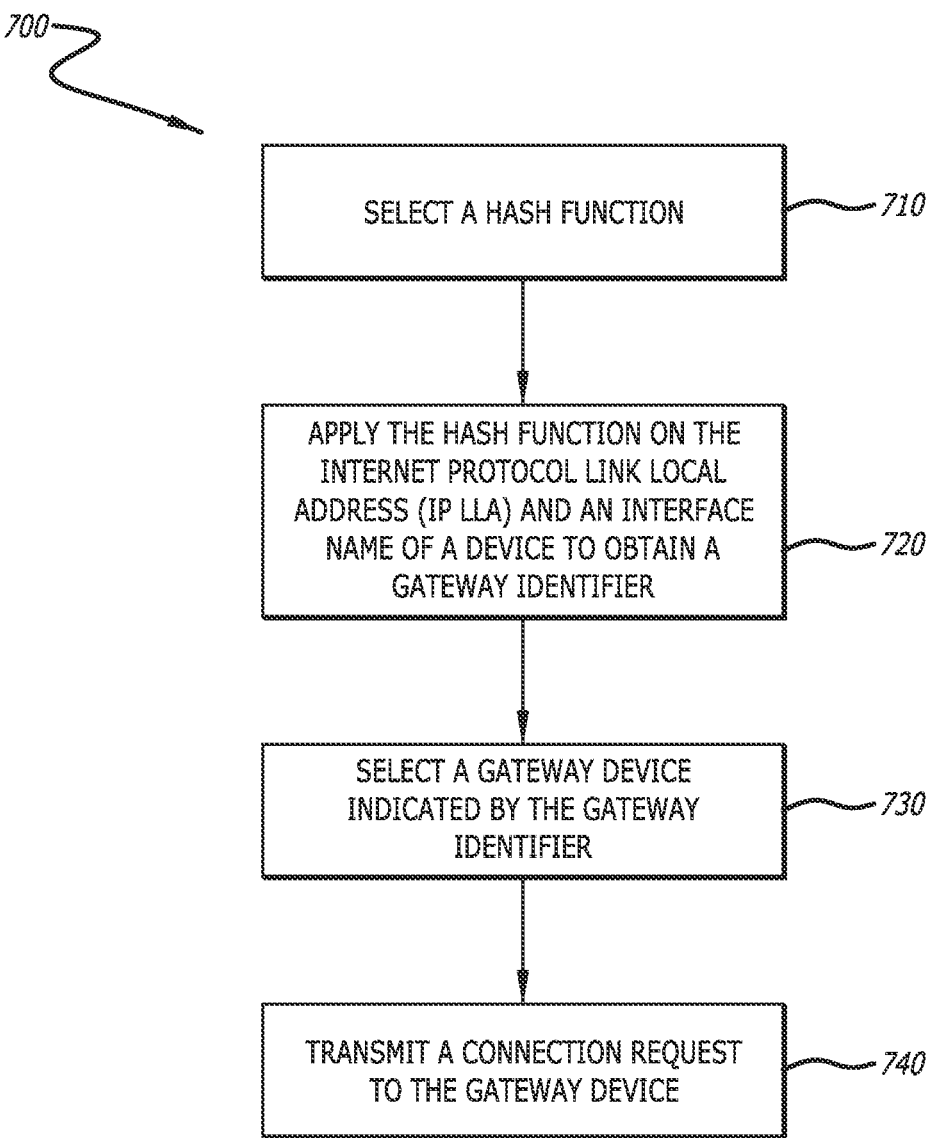
FIG. 7 is a flowchart depicting a process for transmitting a connection request to a gateway device based on a hash function, in accordance with various embodiments of the disclosure.

Referring to FIG. 7, a flowchart depicting a process 700 for transmitting the connection request to the gateway device based on the hash function, in accordance with various embodiments of the disclosure is shown. In many embodiments, the process 700 may select the hash function (block 710). In some embodiments, the process 700 can have access to a hash table. In certain embodiments, a suitable hash function may be selected to identify the gateway device.

In a number of embodiments, the process 700 can apply the hash function on the IP LLA and the interface name (block 720). In some embodiments, the process 700 may obtain the gateway identifier as an output of applying the hash function to the IP LLA and the interface name. In certain embodiments, the process 700 can look up the gateway identifier in the hash table to identify the gateway device.

In various embodiments, the process 700 may select the gateway device indicated by the gateway identifier (block 730). In some embodiments, the gateway identifier may uniquely correspond to the gateway device in the hash table. In certain embodiments, the hash table may be stored or predefined. In more embodiments, the hash table may be updated periodically or dynamically based on changes to the network.

In additional embodiments, the process 700 can transmit the connection request to the gateway device (block 740). In some embodiments, the gateway device can proxy the connection request to the external cloud controller. In certain embodiments, the gateway device may receive the session cookie from the external cloud controller in response to the connection request. In more embodiments, the gateway device may proxy the session cookie to the process 700 by utilizing the IP LLA. In some more embodiments, the process 700 can establish the logical connection with the external cloud controller based on the session cookie.

Although a specific embodiment for the process 700 for carrying out the various steps, processes, methods, and operations described herein is discussed with respect to FIG. 7, any of a variety of systems and/or processes may be utilized in accordance with embodiments of the disclosure. For example, the process 700 may uniquely identify the gateway device from the multiple gateway devices using the hash function. The elements depicted in FIG. 7 may also be interchangeable with other elements of FIGS. 1-6 and FIGS. 8-10 as required to realize a particularly desired embodiment.

Figure 8:
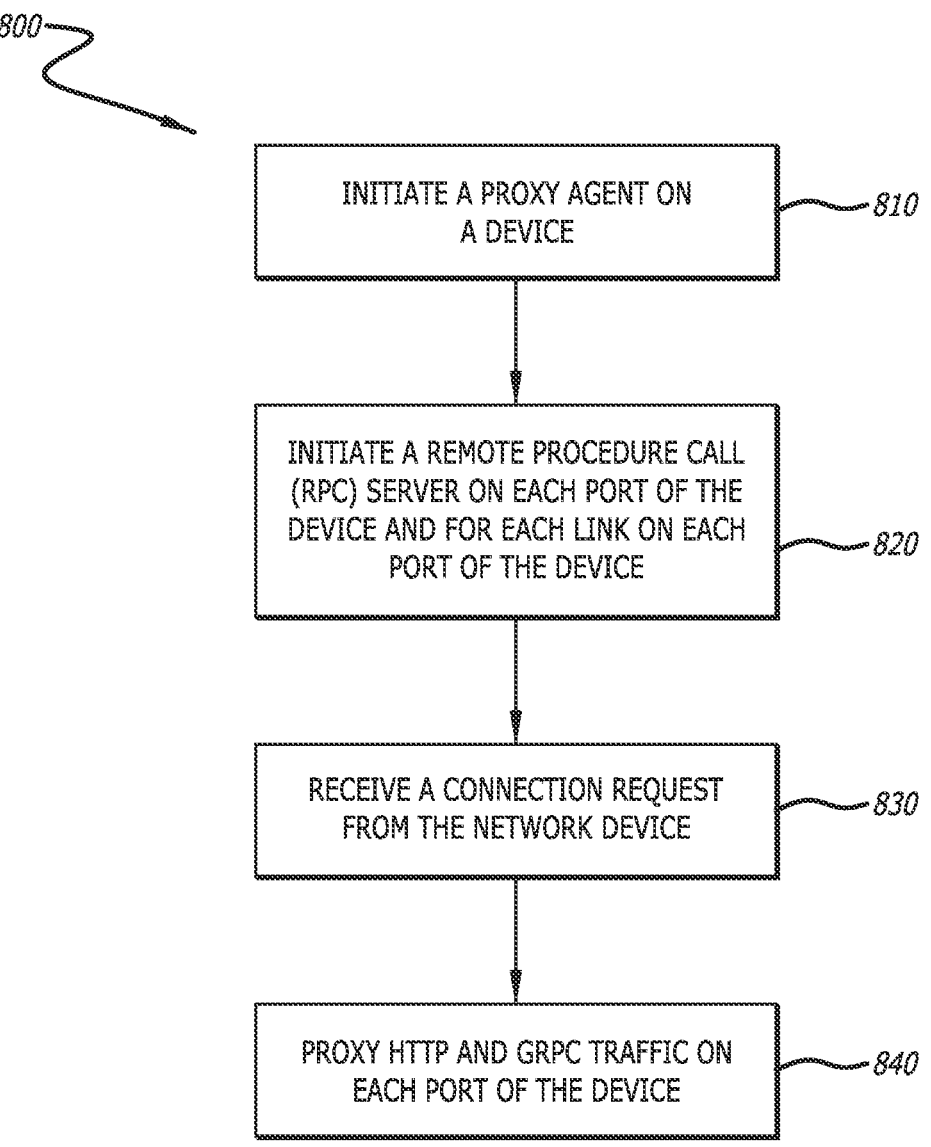
FIG. 8 is a flowchart depicting a process for proxying traffic between a plurality of devices in a network, in accordance with various embodiments of the disclosure.

Referring to FIG. 8, a flowchart depicting a process 800 for proxying the traffic between the plurality of devices in a network, in accordance with various embodiments of the disclosure is shown. In many embodiments, the process 800 may initiate the proxy agent (block 810). In many embodiments, the process 800 can be performed by the gateway device or the non-gateway network device. In process 800 may provide hop-by-hop proxying of data traffic until the data traffic reaches the gateway device.

In a number of embodiments, the process 800 can initiate the RPC server on each port and for each link on each port (block 820). In some embodiments, the process 800 may utilize the RPC server on boot to initiate gRPCs for discovering the network devices. In certain embodiments, the RPC server may call remote functions on other network devices. In more embodiments, the process RPC server can trigger a remote procedure on the other network devices or on the external cloud controller.

In various embodiments, the process 800 may receive the connection request from the network device (block 830). In some embodiments, the connection request may be the request to connect the non-gateway network device to the external cloud controller. In certain embodiments, the process 800 can receive the connection request by way of the IP LLA.

In additional embodiments, the process 800 may proxy the connection request and the HTTP data traffic and gRPC data traffic on all ports (block 840). In some embodiments, the process 800 may initiate the proxy agent to proxy the connection request and the data traffic on all the ports. In certain embodiments, the process 800 can proxy the connection request to the gateway device. In more embodiments, the process 800 may proxy the data traffic between the non-gateway network device and the external cloud controller. In some more embodiments, the process 800 can utilize the IP LLA to proxy the data traffic on the interfaces between the network devices.

Although a specific embodiment for the process 800 for carrying out the various steps, processes, methods, and operations described herein is discussed with respect to FIG. 8, any of a variety of systems and/or processes may be utilized in accordance with embodiments of the disclosure. For example, the process 800 may be implemented by the network devices to provide dynamic per-link proxying of the data traffic. The elements depicted in FIG. 8 may also be interchangeable with other elements of FIGS. 1-7 and FIGS. 9-10 as required to realize a particularly desired embodiment.

Referring to FIG. 9, a flowchart depicting a process 900 for facilitating the logical connection to the external cloud controller by proxying traffic, in accordance with various embodiments of the disclosure is shown. In many embodiments, the process 900 may establish the connection with the external cloud controller (block 910). In some embodiments, the process 900 can be performed by the gateway device or the exit node of the network. In certain embodiments, the process 900 may connect to the external cloud controller through the edge router.

In a number of embodiments, the process 900 can initiate the RPC server (block 920). In some embodiments, the RPC server may call one or more remote functions on other network devices. In certain embodiments, the process RPC server can trigger the remote procedure on the other network devices or on the external cloud controller.

In various embodiments, the process 900 may discover the network devices (block 930). In some embodiments, the process 900 can utilize the RPC server on boot to initiate gRPCs for discovering the network devices. In certain embodiments, the process 900 may utilize the RPC server to communicate with one or more devices external to the network.

In additional embodiments, the process 900 can receive the connection request from the non-gateway network device (block 940). In some embodiments, the connection request may be the request to connect the non-gateway network device to the external cloud controller. In certain embodiments, the connection request may be received over the interface by utilizing the IP LLA. In more embodiments, the connection request can be received by way of the RPC server.

In further embodiments, the process 900 can transmit the connection request to the external cloud controller (block 950). In some embodiments, the process 900 may transmit the connection request by way of the edge router. In certain embodiments, the process 900 can utilize one or more secure communication protocols to communicate with the external cloud controller.

In many more embodiments, the process 900 may receive the session cookie from the external cloud controller (block 960). In some embodiments, the process 900 can proxy the session cookie to the non-gateway network device. In certain embodiments, the proxy agent of the gateway device may proxy the session cookie to the proxy agent of the non-network gateway network device or the proxy agents of the one or more intermediate network devices.

In many additional embodiments, the process 900 can facilitate the establishment of the logical connection between the non-gateway network device and the external cloud controller (block 970). In some embodiments, in this logical connection, the process 900 can proxy the data traffic between the non-gateway network device and the external cloud controller. In certain embodiments, the process 900 may proxy the data traffic between the one or more intermediate network devices and the external cloud controller. In more embodiments, the data traffic can be HTTP data traffic or gRPC data traffic.

Although a specific embodiment for the process 900 for carrying out the various steps, processes, methods, and operations described herein is discussed with respect to FIG. 9, any of a variety of systems and/or processes may be utilized in accordance with embodiments of the disclosure. For example, the process 900 may be implemented by the gateway device to provide the logical connection between the non-gateway network device and the external cloud controller. The elements depicted in FIG. 9 may also be interchangeable with other elements of FIGS. 1-8 and FIG. 10 as required to realize a particularly desired embodiment.

Figure 10:
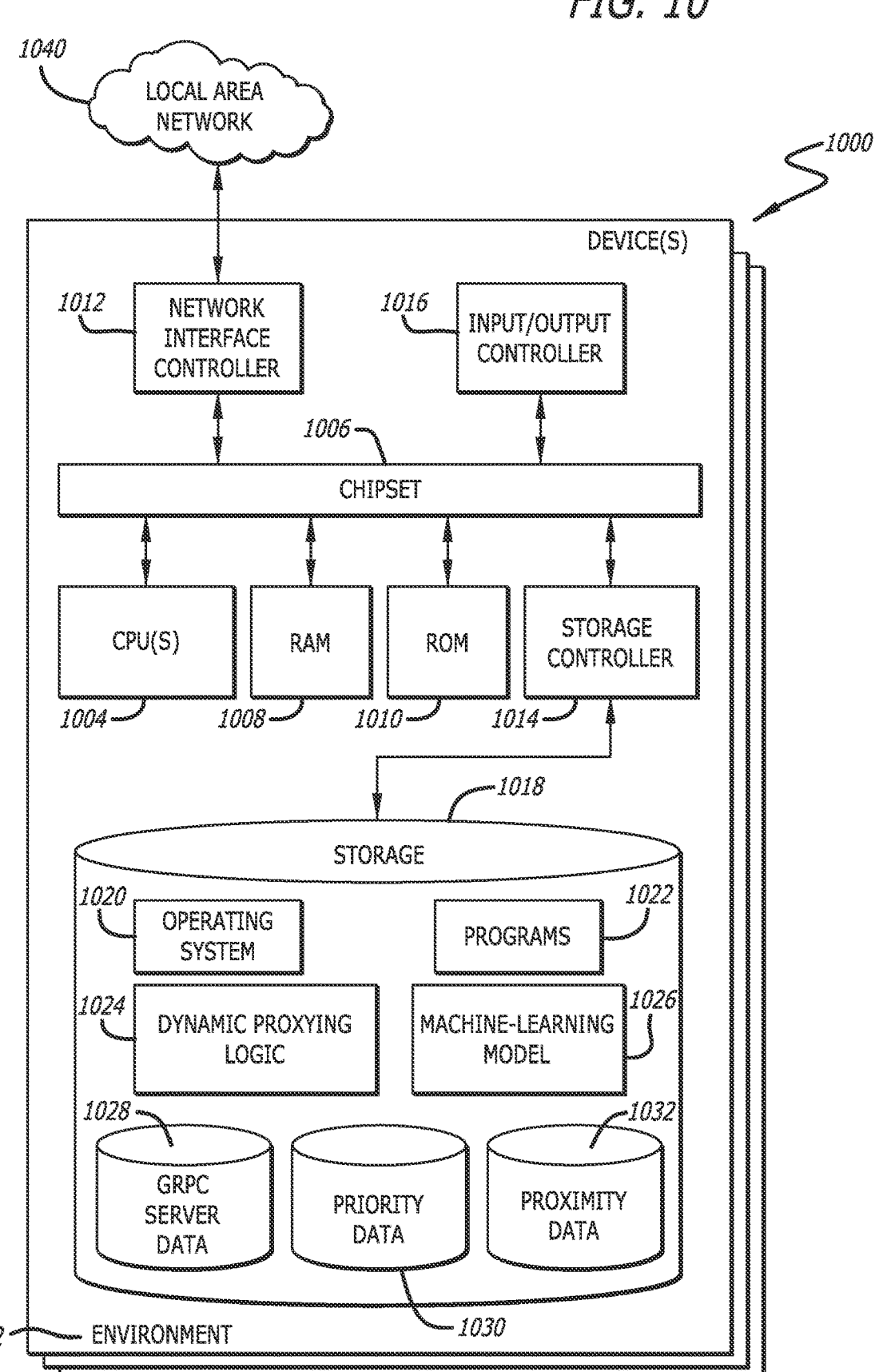
FIG. 10 is a conceptual block diagram of a device suitable for configuration with a dynamic proxying logic, in accordance with various embodiments of the disclosure.

Referring to FIG. 10, a conceptual block diagram of a device 1000 suitable for configuration with a dynamic proxying logic, in accordance with various embodiments of the disclosure is shown. The embodiment of the conceptual block diagram depicted in FIG. 10 can illustrate a conventional server, computer, workstation, desktop computer, laptop, tablet, network appliance, e-reader, smartphone, or other computing device, and can be utilized to execute any of the application and/or logic components presented herein. The embodiment of the conceptual block diagram depicted in FIG. 10 can also illustrate an access point, a switch, or a router in accordance with various embodiments of the disclosure. The device 1000 may, in many non-limiting examples, correspond to physical devices or to virtual resources described herein.

In many embodiments, the device 1000 may include an environment 1002 such as a baseboard or "motherboard," in physical embodiments that can be configured as a printed circuit board with a multitude of components or devices connected by way of a system bus or other electrical communication paths. Conceptually, in virtualized embodiments, the environment 1002 may be a virtual environment that encompasses and executes the remaining components and resources of the device 1000. In more embodiments, one or more processors 1004, such as, but not limited to, central processing units ("CPUs") can be configured to operate in conjunction with a chipset 1006. The processor(s) 1004 can be standard programmable CPUs that perform arithmetic and logical operations necessary for the operation of the device 1000.

In a number of embodiments, the processor(s) 1004 can perform one or more operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

In various embodiments, the chipset 1006 may provide an interface between the processor(s) 1004 and the remainder of the components and devices within the environment 1002. The chipset 1006 can provide an interface to a random-access memory ("RAM") 1008, which can be used as the main memory in the device 1000 in some embodiments. The chipset 1006 can further be configured to provide an interface to a computer-readable storage medium such as a read-only memory ("ROM") 1010 or non-volatile RAM ("NVRAM") for storing basic routines that can help with various tasks such as, but not limited to, starting up the device 1000 and/or transferring information between the various components and devices. The ROM 1010 or NVRAM can also store other application components necessary for the operation of the device 1000 in accordance with various embodiments described herein.

Additional embodiments of the device 1000 can be configured to operate in a networked environment using logical connections to remote computing devices and computer systems through a network, such as the network 1040. The chipset 1006 can include functionality for providing network connectivity through a network interface card ("NIC") 1012, which may comprise a gigabit Ethernet adapter or similar component. The NIC 1012 can be capable of connecting the device 1000 to other devices over the network 1040. It is contemplated that multiple NICs 1012 may be present in the device 1000, connecting the device to other types of networks and remote systems.

In further embodiments, the device 1000 can be connected to a storage 1018 that provides non-volatile storage for data accessible by the device 1000. The storage 1018 can, for instance, store an operating system 1020, applications 1022, gRPC server data 1028, priority data 1030, and proximity data 1032 which are described in greater detail below. The storage 1018 can be connected to the environment 1002 through a storage controller 1014 connected to the chipset 1006. In certain embodiments, the storage 1018 can consist of one or more physical storage units. The storage controller 1014 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units. The priority data 1030 may store priority values assigned to the gateway devices. The proximity data 1032 may store the proximity data or the modified proximity data. The gRPC server data may store RPC instructions. The storage 1018 may further store the hash table.

The device 1000 can store data within the storage 1018 by transforming the physical state of the physical storage units to reflect the information being stored. The specific transformation of physical state can depend on various factors. Examples of such factors can include, but are not limited to, the technology used to implement the physical storage units, whether the storage 1018 is characterized as primary or secondary storage, and the like.

In many more embodiments, the device 1000 can store information within the storage 1018 by issuing instructions through the storage controller 1014 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit, or the like. Other transformations of physical media are possible without departing from the scope and spirit of the present description, with the foregoing examples provided only to facilitate this description. The device 1000 can further read or access information from the storage 1018 by detecting the physical states or characteristics of one or more particular locations within the physical storage units.

In addition to the storage 1018 described above, the device 1000 can have access to other computer-readable storage media to store and retrieve information, such as program modules, data structures, or other data. It should be appreciated by those skilled in the art that computer-readable storage media is any available media that provides for the non-transitory storage of data and that can be accessed by the device 1000. In some examples, the operations performed by a cloud computing network, and or any components included therein, may be supported by one or more devices similar to device 1000. Stated otherwise, some or all of the operations performed by the cloud computing network, and or any components included therein, may be performed by one or more devices 1000 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage 1018 can store an operating system 1020 utilized to control the operation of the device 1000. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage 1018 can store other system or application programs and data utilized by the device 1000.

In many additional embodiments, the storage 1018 or other computer-readable storage media is encoded with computer-executable instructions which, when loaded into the device 1000, may transform it from a general-purpose computing system into a special-purpose computer capable of implementing the embodiments described herein. These computer-executable instructions may be stored as application 1022 and transform the device 1000 by specifying how the processor(s) 1004 can transition between states, as described above. In some embodiments, the device 1000 has access to computer-readable storage media storing computer-executable instructions which, when executed by the device 1000, perform the various processes described above with regard to FIGS. 1-9. In certain embodiments, the device 1000 can also include computer-readable storage media having instructions stored thereupon for performing any of the other computer-implemented operations described herein.

In many further embodiments, the device 1000 may include a dynamic proxying logic 1024. The dynamic proxying logic 1024 can be configured to perform one or more of the various steps, processes, operations, and/or other methods that are described above. Often, the dynamic proxying logic 1024 can be a set of instructions stored within a non-volatile memory that, when executed by the processor(s)/controller(s) 1004 can carry out these steps, etc. In some embodiments, the dynamic proxying logic 1024 may be a client application that resides on a network-connected device, such as, but not limited to, a server, switch, personal or mobile computing device in a single or distributed arrangement. In certain embodiments, the dynamic proxying logic 1024 proxies the HTTP and gRPC data traffic on multiple ports of the device 1000.

In still further embodiments, the device 1000 can also include one or more input/output controllers 1016 for receiving and processing input from a number of input devices, such as a keyboard, a mouse, a touchpad, a touch screen, an electronic stylus, or other type of input device. Similarly, an input/output controller 1016 can be configured to provide output to a display, such as a computer monitor, a flat panel display, a digital projector, a printer, or other type of output device. Those skilled in the art will recognize that the device 1000 might not include all of the components shown in FIG. 10 and can include other components that are not explicitly shown in FIG. 10 or might utilize an architecture completely different than that shown in FIG. 10.

As described above, the device 1000 may support a virtualization layer, such as one or more virtual resources executing on the device 1000. In some examples, the virtualization layer may be supported by a hypervisor that provides one or more virtual machines running on the device 1000 to perform functions described herein. The virtualization layer may generally support a virtual resource that performs at least a portion of the techniques described herein.

Finally, in numerous additional embodiments, data may be processed into a format usable by a machine-learning model 1026 (e.g., feature vectors), and or other pre-processing techniques. The machine-learning ("ML") model 1026 may be any type of ML model, such as supervised models, reinforcement models, and/or unsupervised models. The ML model 1026 may include one or more of linear regression models, logistic regression models, decision trees, Naïve Bayes models, neural networks, k-means cluster models, random forest models, and/or other types of ML models 1026.

The ML model(s) 1026 can be configured to generate inferences to make predictions or draw conclusions from data. An inference can be considered the output of a process of applying a model to new data. This can occur by learning from at least the gRPC server data 1028, the priority data 1030 and the proximity data 1032 and use that learning to predict future outcomes. These predictions are based on patterns and relationships discovered within the data. To generate an inference, the trained model can take input data and produce a prediction or a decision. The input data can be in various forms, such as images, audio, text, or numerical data, depending on the type of problem the model was trained to solve. The output of the model can also vary depending on the problem, and can be a single number, a probability distribution, a set of labels, a decision about an action to take, etc. Ground truth for the ML model(s) 1026 may be generated by human/administrator verifications or may compare predicted outcomes with actual outcomes.

Although a specific embodiment for a device suitable for configuration with a dynamic proxying logic for carrying out the various steps, processes, methods, and operations described herein is discussed with respect to FIG. 10, any of a variety of systems and/or processes may be utilized in accordance with embodiments of the disclosure. For example, the device may be in a virtual environment such as a cloud-based network administration suite, or it may be distributed across a variety of network devices or switches. The elements depicted in FIG. 10 may also be interchangeable with other elements of FIGS. 1-9 as required to realize a particularly desired embodiment.

Although the present disclosure has been described in certain specific aspects, many additional modifications and variations would be apparent to those skilled in the art. In particular, any of the various processes described above can be performed in alternative sequences and/or in parallel (on the same or on different computing devices) in order to achieve similar results in a manner that is more appropriate to the requirements of a specific application. It is therefore to be understood that the present disclosure can be practiced other than specifically described without departing from the scope and spirit of the present disclosure. Thus, embodiments of the present disclosure should be considered in all respects as illustrative and not restrictive. It will be evident to the person skilled in the art to freely combine several or all of the embodiments discussed here as deemed suitable for a specific application of the disclosure. Throughout this disclosure, terms like "advantageous", "exemplary" or "example" indicate elements or dimensions which are particularly suitable (but not essential) to the disclosure or an embodiment thereof and may be modified wherever deemed suitable by the skilled person, except where expressly required. Accordingly, the scope of the disclosure should be determined not by the embodiments illustrated, but by the appended claims and their equivalents.

Any reference to an element being made in the singular is not intended to mean "one and only one" unless explicitly so stated, but rather "one or more." All structural and functional equivalents to the elements of the above-described preferred embodiment and additional embodiments as regarded by those of ordinary skill in the art are hereby expressly incorporated by reference and are intended to be encompassed by the present claims.

Moreover, no requirement exists for a system or method to address each and every problem sought to be resolved by the present disclosure, for solutions to such problems to be encompassed by the present claims. Furthermore, no element, component, or method step in the present disclosure is intended to be dedicated to the public regardless of whether the element, component, or method step is explicitly recited in the claims. Various changes and modifications in form, material, workpiece, and fabrication material detail can be made, without departing from the spirit and scope of the present disclosure, as set forth in the appended claims, as might be apparent to those of ordinary skill in the art, are also encompassed by the present disclosure.

What is claimed is:

1. A device, comprising:
   a processor;
   a memory communicatively coupled to the processor; and
   a dynamic proxying logic, configured to:
      discover a plurality of network devices;
      transmit proximity data to the plurality of network devices;

receive modified proximity data from the plurality of network devices;

identify one or more gateway devices from the plurality of network devices;

select a gateway device from the one or more gateway devices based on the modified proximity data;

transmit a connection request to a proxy agent on the selected gateway device using an Internet Protocol Link Local Address (IP LLA);

receive a session cookie from the selected gateway device; and establish a logical connection with an external cloud controller based on the session cookie.

2. The device of claim 1, wherein the proximity data is indicative of one or more hop counts between the device and one or more network devices of the plurality of network devices, and wherein the modified proximity data is indicative of a plurality of hop counts between the plurality of network devices and the device.

3. The device of claim 2, wherein the selected gateway device has lowest hop count.

4. The device of claim 2, wherein the dynamic proxying logic is further configured to:

determine the one or more gateway devices having lowest hop count as one or more closest gateway devices;

determine a priority assigned to each closest gateway device of the one or more closest gateway devices; and select a closest gateway device, from the one or more closest gateway devices, having highest priority.

5. The device of claim 1, wherein the dynamic proxying logic is further configured to:

select a hash function;

apply the hash function on the IP LLA and an interface name of the device to obtain a gateway identifier; and select the gateway device indicated by the gateway identifier.

6. The device of claim 1, wherein the one or more gateway devices are connected to the external cloud controller by way of an edge router.

7. The device of claim 1, wherein the dynamic proxying logic is further configured to initiate a proxy agent to proxy data traffic on each port of the device.

8. The device of claim 7, wherein the dynamic proxying logic is further configured to initiate a Remote Procedure Call (RPC) server on each port of the device and for each link on each port of the device.

9. The device of claim 8, wherein each link on each port of the device is connected to a network device of the plurality of network devices, and wherein the plurality of network devices are discovered using the RPC server.

10. The device of claim 9, wherein the dynamic proxying logic is further configured to receive the connection request from the network device using the RPC server.

11. A device, comprising:

a processor; a memory communicatively coupled to the processor; and a dynamic proxying logic, configured to: establish a connection with an external cloud controller; receive a session cookie from the external cloud controller; initiate a proxy agent to proxy data traffic on each port of the device; initiate a Remote Procedure Call (RPC) server; discover a plurality of network devices using the RPC server; receive, by the proxy agent, a connection request from a network device of the plurality of network devices using an Internet Protocol Link Local Address (IP LLA); and transmit the connection request to the external cloud controller.

12. The device of claim 11, wherein the network device establishes a logical connection with the external cloud controller based on the session cookie.

13. The device of claim 11, wherein the device is connected to the external cloud controller by way of an edge router.

14. The device of claim 11, wherein the dynamic proxying logic is further configured to initiate a proxy agent to proxy data traffic on each port of the device.

15. The device of claim 14, wherein the dynamic proxying logic is further configured to initiate the RPC server on each port of the device and for each link on each port of the device.

16. A method, comprising:

discovering a plurality of network devices;

transmitting proximity data to the plurality of network devices;

receiving modified proximity data from the plurality of network devices;

identifying one or more gateway devices from the plurality of network devices;

selecting a gateway device from the one or more gateway devices based on the modified proximity data;

transmitting a connection request to a proxy agent on the selected gateway device using an Internet Protocol Link Local Address (IP LLA);

receiving a session cookie from the selected gateway device; and establishing a logical connection with an external cloud controller based on the session cookie.

17. The method of claim 16, wherein the proximity data is indicative of one or more hop counts for one or more network devices of the plurality of network devices, and wherein the modified proximity data is indicative of a plurality of hop counts for the plurality of network devices.

18. The method of claim 17, wherein the selected gateway device has lowest hop count.

19. The method of claim 17, further comprising:

determining the one or more gateway devices having lowest hop count as one or more closest gateway devices;

determining a priority assigned to each closest gateway device of the one or more closest gateway devices; and selecting a closest gateway device, from the one or more closest gateway devices, having highest priority.

20. The method of claim 16, further comprising:

selecting a hash function;

applying the hash function on the IP LLA and an interface name to obtain a gateway identifier; and selecting the gateway device indicated by the gateway identifier.

* * * * *